3,304,622
HOT PRESS OUTFEED COOLING APPARATUS
Glenn W. Stevens and Alan A. Siewert, Salem, Oreg., assignors to Stevens Steel and Equipment Co., Salem, Oreg., a corporation of Oregon
Filed July 22, 1963, Ser. No. 296,701
2 Claims. (Cl. 34—55)

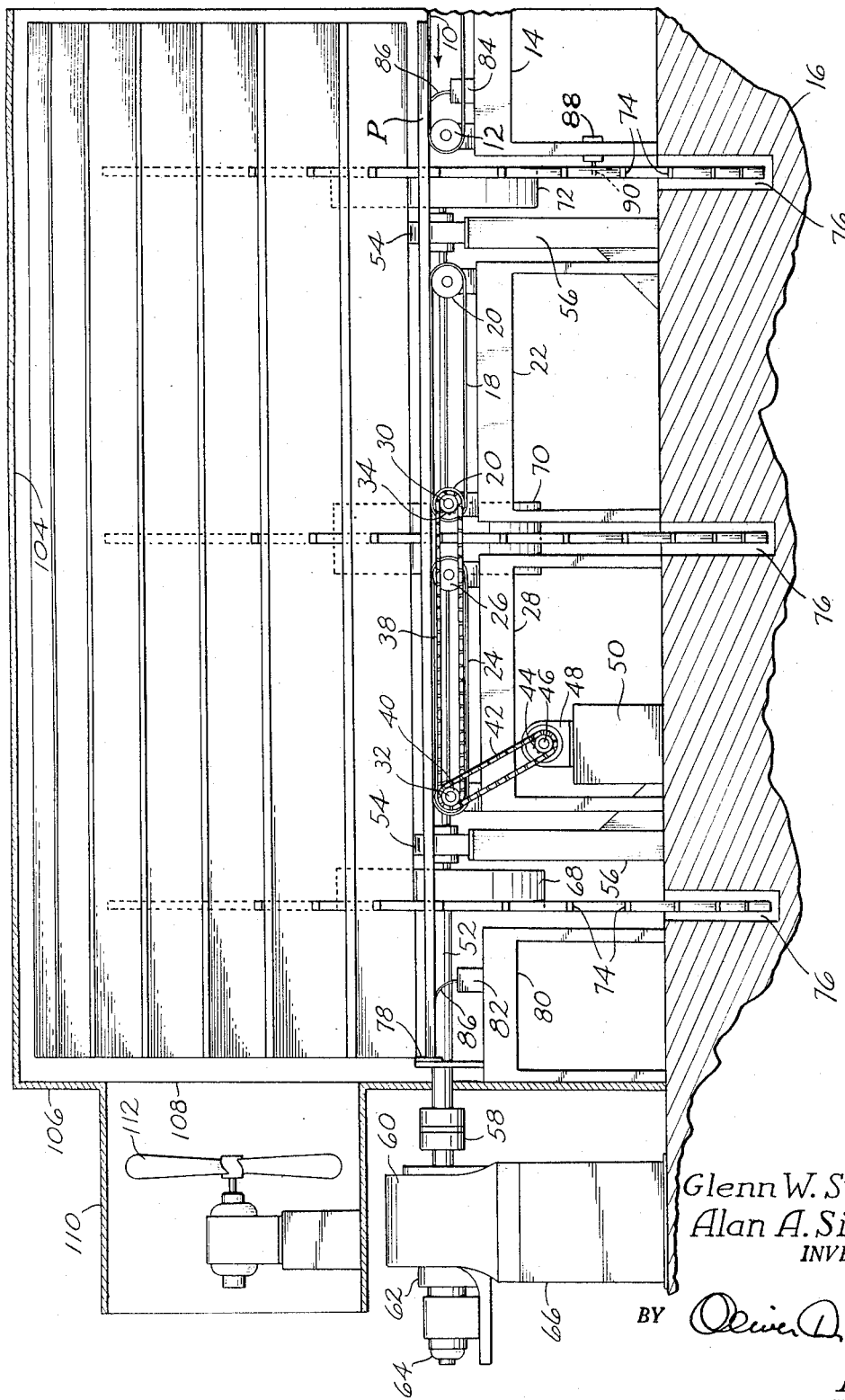

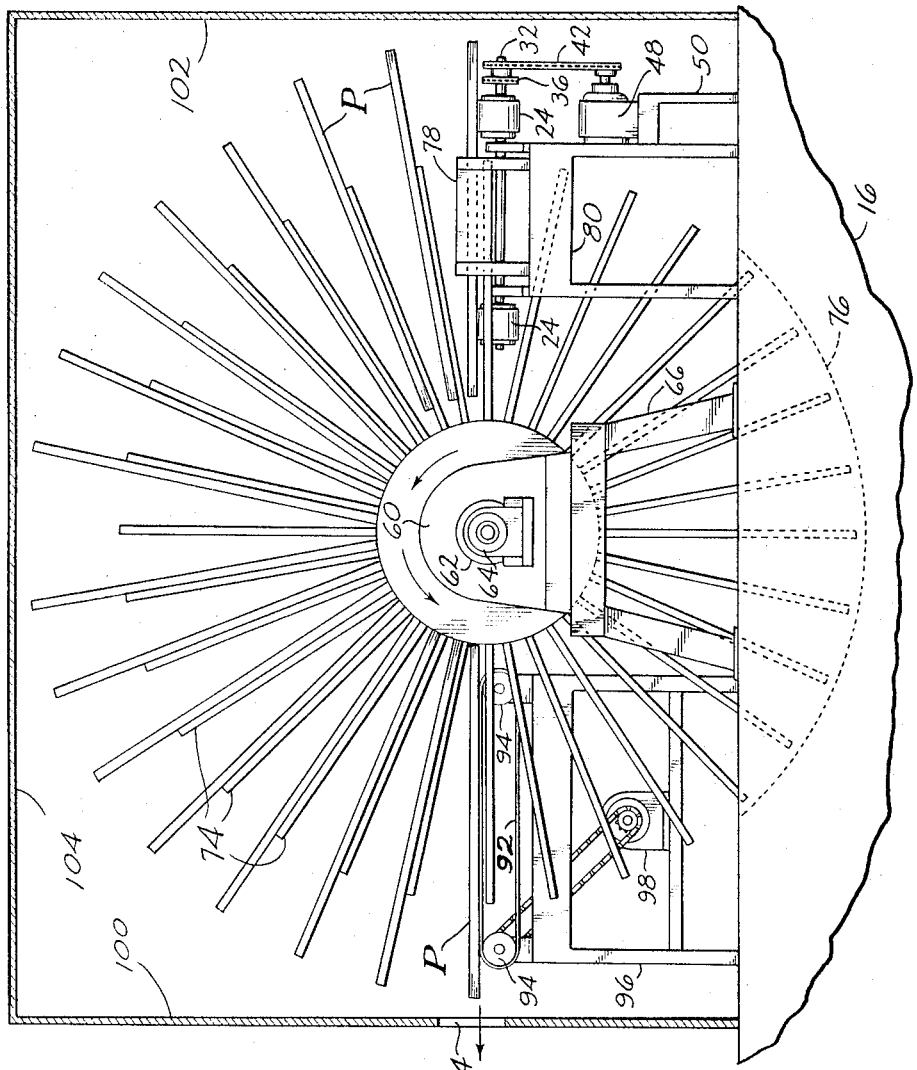
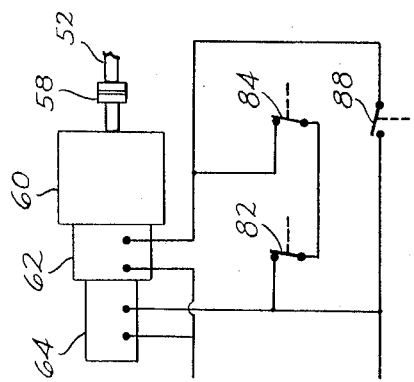

This invention relates to apparatus for cooling panels of plywood, hardboard and the like emerging from the hot press, and has for its primary objective the provision of apparatus of the class described which affords the following advantages:

The apparatus functions automatically to receive the hot press outfeed, one panel at a time, and to cycle the panels through a cooling zone while simultaneously transferring them to a subsequent station.

The apparatus is adaptable for installation at the outfeed of a variety of types of hot presses, for handling a variety of panel products.

The apparatus has a large capacity, accommodating the output of conventional hot presses without loss of production capacity.

The apparatus requires a minimum of floor space, thus permitting its integration into production lines with maximum facility.

The apparatus is of simplified construction for economical manufacture, and provides long and faithful operation with minimum maintenance and repair.

The foregoing and other objects and advantages of the present invention will appear from the following detailed description, taken in connection with the accompanying drawing in which:

FIG. 1 is a fragmentary view in side elevation, partly in section, of panel cooling apparatus embodying the features of the present invention;

FIG. 2 is a fragmentary end elevation viewed from the left in FIG. 1; and

FIG. 3 is a schematic electrical diagram of an automatic timing circuit for the apparatus.

Referring particularly to FIG. 1 of the drawings, there is shown one of a pair of laterally spaced endless outfeed conveyor belts 10 which serve to carry away the panels P emerging from a hot press. The belts are trained over longitudinally spaced rolls 12 supported for rotation on a frame 14 which rests upon the floor 16 of the plant. One or more of the rolls are driven, by suitable means, preferably to provide continuous outfeed movement of the belts.

Aligned longitudinally with the outfeed conveyor is a longitudinally spaced pair of cooler infeed conveyors. The rearward one of the pair of infeed conveyors includes a pair of laterally spaced continuous belts 18 trained over longitudinally spaced rolls 20 mounted for rotation on the frame 22. The rearward ends of these belts are spaced longitudinally forward of the outfeed conveyor belts 10. The forward one of the pair of infeed conveyors similarly includes a pair of laterally spaced continuous belts 24 trained over longitudinally spaced rolls 26 mounted for rotation on the frame 28. The rearward ends of these belts 24 are spaced longitudinally forward of the front ends of the belts 18. The shafts 30 and 32 supporting the forward rollers of each of the pair of infeed conveyors, extend laterally and mount sprockets 34 and 36 which are interconnected by the common drive chain 38. An additional sprocket 40, mounted on the forwardmost roller shaft 32, is connected through the drive chain 42 to a cooperating sprocket 44 carried on the output drive shaft 46 of an electric or other suitable drive motor 48 which, preferably is operated continuously to maintain the infeed conveyors in continuous operation. The drive motor is mounted on the supporting frame 50.

Positioned along side and substantially parallel to the infeed conveyors is an elongated shaft 52 mounted for rotation in longitudinally spaced bearings 54 supported upon the frame 56. The axis of the shaft preferably is located slightly below the horizontal plane of the upper working stretches of the infeed conveyor belts 18 and 24, for the purposes explained more fully hereinafter. The shaft is connected, through coupling 58, to the output shaft of a gear reduction unit 60, the input of which is connected releasably, through an electrically actuated clutch 62, to an electric or other suitable drive motor 64. This drive assembly is mounted on the supporting frame 66. Although various types of electrically actuated clutches may be employed, the type preferred for this purpose is a combination magnetic clutch and brake assembly, well known in the art.

Secured at longitudinally spaced intervals along the shaft 52 are the spoke hubs 68, 70 and 72. Secured to each of the hubs and radiating outwardly therefrom are a plurality of spoke rods 74. In the embodiment illustrated there are 32 spokes radiating from each hub, although it will be understood that the number may be varied as desired. Each spoke on each hub is aligned on a common axial plane with a spoke on each of the other hubs, whereby the aligned group of longitudinally spaced spokes form a common support for a panel.

Because of the length of the spokes which radiate from the shaft 52, arcuate troughs 76 are formed in the floor 16 to permit mounting of the shaft and the infeed conveyors at a convenient working level of elevation above the floor.

The forwardmost assembly of spokes, mounted on hub 68, is positioned forwardly of the front end of the infeed conveyor belts 24, and the spokes project outward beyond the midpoint between the laterally spaced belts 24 in order to support more than half the width of a panel P delivered to them on the belts. The intermediate assembly of spokes, mounted on hub 70, is positioned between the belts 18 and 24 of the longitudinally spaced pair of infeed conveyors, and the spokes thereof terminate inward of the drive chain 38 which spans said space. The rearward assembly of spokes, mounted on hub 72, is positioned between the forward end of the outfeed conveyor belts 10 and the rearward end of the infeed conveyor belts 18.

The infeed conveyors move the panel to a position overlying the three aligned spokes. This position is established by abutment of the forward end of the panel against the stop 78 mounted on the frame 80.

Means is provided for rotating the spoke assemblies in sequential arcuate segments automatically as each panel is delivered from the outfeed conveyor. In the embodiment illustrated, this control means includes the pair of normally open panel-actuated electric swtiches 82 and 84, the first being located adjacent the forwardmost spoke assembly and the second being located adjacent the rearward spoke assembly. The switches are spaced apart a distance less than the length of the panel being delivered to the cooling apparatus. The actuators of these switches are elongated resilient fingers 86 which project upward beyond the plane of the upper working stretches of the conveyor belts for interception by a panel P as the latter progresses from the outfeed conveyor across the infeed conveyors. Shunting these series-connected switches is a stepping switch 88 mounted on the frame 14 and arranged with its actuator rod 90 projecting into the path of rotary movement of the rearward assembly of spokes carried by hub 72. The stepping switch is normally closed, and cooperates with the panel-actuated switches in the manner now to be described.

With the actuator 90 of the stepping switch 88 engaged by one of the spokes 74, and with no panel P delivered across the infeed conveyor belts 18 and 24, the electric circuit of the clutch 62 is incomplete by virtue of the open conditions of the switches 82, 84 and 88. The spoke assembly thus is rendered stationary while a panel P is delivered to it, whereupon the switches 82 and 84 are caused to be closed (FIG. 3) to complete the electric circuit of the clutch. The latter thereby effects connection of the continuously driven motor 64 to the gear reduction unit 60. Rotation of the spoke shaft 52 in the counterclockwise direction indicated by the arrows in FIG. 2, thus brings the aligned group of spokes underlying the panel into supporting contact with the under side of the panel, elevating the latter from the infeed conveyor belts.

As the spoke shaft continues its counterclockwise rotation, the stepping switch 88 first is closed, by disengagement of its actuator 90 from the spoke which had opened the switch. Continued rotation of the shaft 52 then causes opening of the switches 82 and 84 by elevation of the panel which had previously closed said switches.

By virtue of the closed stepping switch 88, the spoke assembly continues to rotate counterclockwise until the next succeeding spoke of the rear assembly engages the actuator of the stepping switch and opens the latter. At this point both of the parallel switch circuits are open, whereupon the clutch is deactivated and the gear reduction unit is disconnected from the drive motor. Simultaneously, the magnetic brake is energized to brake the gear reduction unit quickly, to insure against over-run of the spoke shaft. The next succeeding aligned group of spokes thus is brought to precise position immediately below the plane of the working stretches of the infeed conveyor belts, in readiness to receive the next succeeding panel.

The foregoing sequence of operations is repeated automatically by each succeeding panel as it is delivered from the outfeed conveyor. Thus, the outfeed from the hot press may be at regular or randomly variable intervals, and the operation of the cooling apparatus will be governed accordingly.

As panels continue to enter the cooling apparatus, the preceding panels are rotated, counterclockwise in FIG. 2, in stepwise fashion, being supported at their inner edges against the spoke hubs 68, 70 and 72. Each panel ultimately traverses the vertical, or twelve o'clock position, whereupon it falls, counterclockwise, by gravity into supporting engagement by the group of aligned spokes which next precedes the spokes which originally supported the panel. Continued counterclockwise rotation of the spoke assembly ultimately brings each panel onto the working stretches of the offbearing conveyor assembly.

The offbearing conveyor assembly includes a pair of longitudinally spaced endless conveyor belts 92 one disposed between the rearward and intermediate spoke assemblies and the other disposed between the intermediate and forward spoke assemblies. Each of the conveyor belts is trained over laterally spaced rollers 94 mounted for rotation on the frame 96 and driven continuously by the electric motor 98.

The working stretches of the offbearing conveyor belts preferably are positioned in the horizontal plane of the working stretches of the infeed conveyor belts 18 and 24. Thus, as one panel is delivered to the infeed conveyor belts, while the spoke assembly is stopped from rotating, another panel which has been cooled to the appropriate degree during the relatively long period of time required for the substantially 180° stepwise rotation of the spoke assembly, is transferred to the offbearing conveyor belts which move the panel radially outward to a subsequent station for further processing.

In the embodiment illustrated, the spoke assembly and associated infeed and offbearing conveyor assemblies are confined within a housing which includes the side walls 100 and 102, top wall 104 and front wall 106. The rearward side of the housing faces the offbearing conveyor of the hot press, and is open. An opening 108 in the front wall is enclosed by a hollow conduit 110 which supports a large capacity, motor driven fan 112 by which air is forced through the housing, from front to rear, to accelerate the cooling of the panels.

An elongated opening 114 in the side wall 100 registers with the plane of the offbearing conveyor belts 92, for removal of the panels from the cooling apparatus.

It will be apparent to those skilled in the art that various changes may be made in the details of construction described hereinbefore. For example, switch 84 may be omitted although its use in series with switch 82 is preferred since the combination insures against the feeding of broken panels to the cooling apparatus. The fan 112 and associated housing may be omitted if the degree of cooling can be achieved merely by normal air currents in the plant. The number of spoke assemblies may be reduced to two, as by omitting the intermediate assembly on hub 70 and combining the two infeed conveyors into one, or increased to four or more, instead of the three assemblies illustrated. The stepping switch 88 may be positioned for operation by projections or means other than the spokes per se but which operatively associate the spokes with the operation of the switch. Other changes also may be made without departing from the spirit of this invention and the scope of the appended claims.

Having now described our invention and the manner in which it may be used, what we claim as new and desire to secure by Letters Patent is:

1. Apparatus for cooling the panel outfeed from a hot press, comprising horizontal infeed conveyor means spaced outwardly from a hot press outfeed conveyor and having rear and front ends, a pair of spoke assemblies mounted for rotation on a horizontal axis and spaced one adjacent each end of the infeed conveyor means, electrically actuated drive means for the spoke assemblies having an electric circuit, each spoke assembly including a plurality of radially extending elongated spokes, each aligned in a radial plane with a spoke of the other assembly, each aligned pair of spokes being arranged upon rotation of the assemblies to intercept the path of travel of a panel on the infeed conveyor means, whereby to engage under the panel and elevate the latter from the infeed conveyor means, first switch means in said electric circuit positioned adjacent the front end of the infeed conveyor means and operatively engageable by the leading end of a panel on the infeed conveyor means to activate the electrically actuated drive means and rotate the spoke assemblies, upon positioning of the panel for elevation by a spoke pair second switch means in parallel with the first switch means in said electric circuit operatively engageable by a spoke of each aligned pair to deactivate the electrically actuated drive means and stop the rotation of the spoke assemblies with an aligned pair of spokes positioned slightly below the plane of the infeed conveyor means and third switch means in series with the first switch means and in parallel with the second switch means and positioned adjacent the rear end of the infeed conveyor means for establishing the minimum length of panel capable of activating the electrically actuated drive means.

2. Apparatus for cooling the panel outfeed from a hot press, comprising horizontal infeed conveyor means including a pair of longitudinally spaced front and rear conveyors, the rear conveyor being spaced outwardly from a hot press outfeed conveyor, three spoke assemblies mounted for rotation on a horizontal axis, the front infeed conveyor being positioned between the front and intermediate spoke assemblies and the rear infeed conveyor being positioned between the intermediate and rear spoke assemblies, electrically actuated drive means for the spoke assemblies having an electric circuit, each spoke assembly including a plurality of radially extending elongated spokes, each aligned in a radial plane with a spoke of the other assemblies, each aligned group of spokes being arranged upon rotation of the assemblies to intercept the path of travel of a panel on the infeed conveyor means, whereby to engage under the panel and elevate the latter from the infeed conveyor means, first switch means in said electric circuit positioned adjacent the front end of the infeed conveyor means and operatively engageable by the leading end of a panel on the infeed conveyor means to activate the electrically actuated drive means and rotate the spoke assemblies, upon positioning of the panel for elevation by a spoke group second switch means in parallel with the first switch means in said electric circuit operatively engageable by a spoke of each aligned group to deactivate the electrically actuated drive means and stop the rotation of the spoke assemblies with an aligned group of spokes positioned slightly below the plane of the infeed conveyor means, third switch means in series with the first switch means and in parallel with the second switch means and positioned adjacent the rear end of the infeed conveyor means for establishing the minimum length of panel capable of activating the electrically actuated drive means, and stop means adjacent the front end of the infeed conveyor means for limiting the forward movement of a panel thereon.

References Cited by the Examiner
UNITED STATES PATENTS

| | | | |
|---|---|---|---|
| 1,298,828 | 4/1919 | Todhunter | 34—150 |
| 2,002,720 | 5/1935 | Smith | 34—150 X |
| 2,724,482 | 11/1955 | De Francisci | 34—162 X |
| 3,080,052 | 3/1963 | Hanbury | 209—75 |

DONLEY J. STOCKING, *Primary Examiner.*

WILLIAM F. O'DEA, FREDERICK L. MATTESON, JR., *Examiners.*

C. R. REMKE, *Assistant Examiner.*